June 23, 1964 E. E. RINTALA 3,138,300
BULK FEED UNLOADER
Filed Sept. 15, 1961
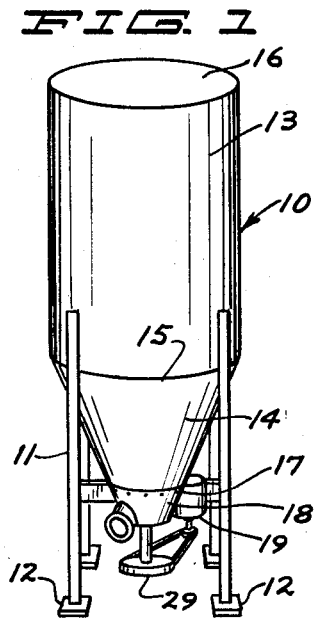
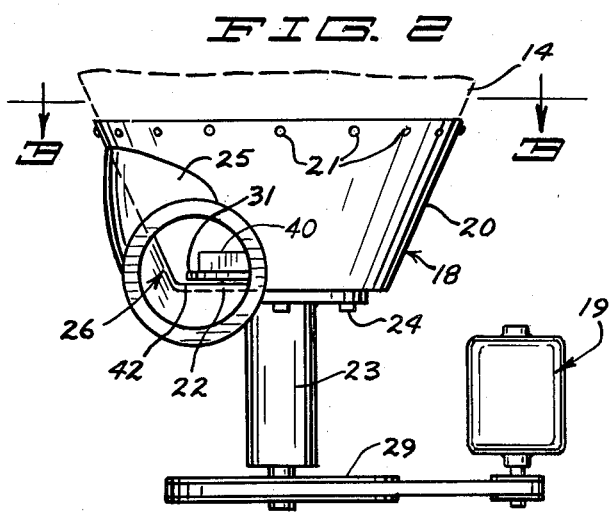
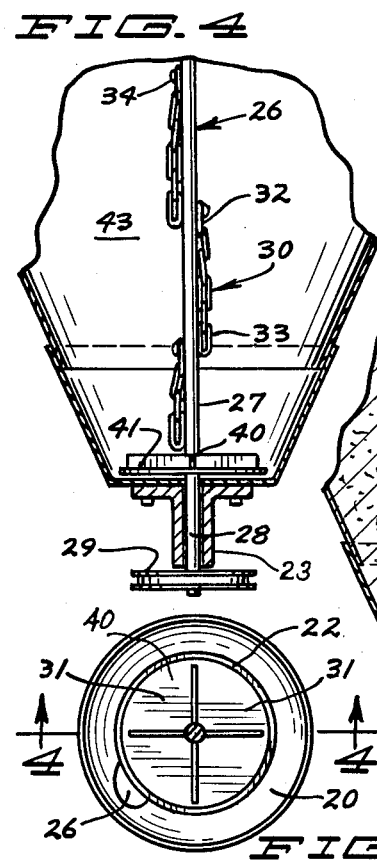
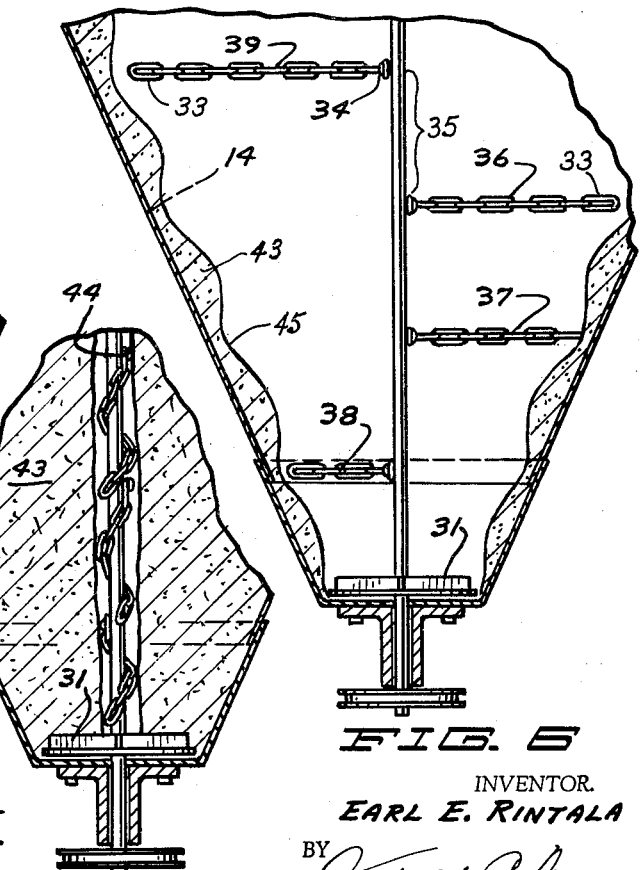
INVENTOR.
EARL E. RINTALA
BY
ATTORNEY United States Patent Office  3,138,300
Patented June 23, 1964

3,138,300
BULK FEED UNLOADER
Earl E. Rintala, Dassel, Minn., assignor to Rint, Inc.,
Dassel, Minn., a corporation of Minnesota
Filed Sept. 15, 1961, Ser. No. 138,425
1 Claim. (Cl. 222—228)

This invention relates to unloading machinery and more particularly to a bulk material storage tank and unloader assemblage.

Bulk materials are often stored in large tanks and through means such as augers, belt conveyors, etc., are gradually removed for use. If the bulk material consists of a smooth and dry granulation, there is usually no problem encountered with unloading the material from the storage tank since the material will freely flow, usually by gravitational flow, to the discharging means utilized. However, when bulk materials of irregular shapes or sticky character are stored, the material will often pack together and, by adhesion to other material and the walls of the tank, be prevented from freely flowing and feeding to the discharging means. This problem is particularly troublesome with materials such as animal feeds which are fortified with viscous food concentrates.

An object of this invention is to provide a simple and efficient storage tank and unloader assemblage which is particularly suitable for sotarge and unloading of granulated bulk material having poor flow characteristics due to particle adhesion or surface interlock.

Another object of this invention is to provide a reliable unloader in the above described assemblage which requires a low starting torque as well as low running torque even though the unloader is in continual direct contact with the bulk material. Thus the unloader has a high capacity with a low power consumption.

A further object is to provide a storage and unloader assemblage, as described, which causes the bulk material contents to settle downwardly by gravity and to be positively removed through a discharge port which provides a maximum discharge capacity without choking or lodging.

Another object of this invention is to provide a rotating mechanism with flexible members in a gravity-type storage bin which temporarily retract when encountering a heavy starting load, thus requiring less initial torque.

These and other objects and advantages of this invention will more fully appear from the following description, made in connection with the accompanying drawing, wherein like reference characters refer to the same or similar parts throughout the several views and in which:

FIGURE 1 is a perspective view of the assemblage showing an erected storage tank and unloader attached thereto;

FIGURE 2 is an enlarged side view of the unloader, the dotted lines representing the lower portion of the storage tank;

FIGURE 3 is a top view, in reduced size, of FIGURE 2 taken on line 3—3;

FIGURE 4 is a vertical section of a lower segment of the assemblage taken one line 4—4 of FIGURE 3, the parts being in non-operating condition;

FIGURE 5 is a view similar to that of FIGURE 4 showing the flexible members as they react to initial starting of the unloader when bulk material is surrounding the shaft; and FIGURE 6 is a view similar to that of FIGURE 5 but with the flexible members shown in extended position during the usual unloading operation.

Referring again particularly now to FIGURE 1, a typical storage tank 10 is shown having permanent installation supports such as braces 11 and cement footings 12. The tank consists of an upstanding hollow enclosure having an upper cylindrical portion 13 and a lower frusto-conical portion 14 secured thereto at 15. Tank 10 has an upper loading opening 16 and a lower end unloading opening 17.

Forming a part of the assemblage is the unloader 18 which is secured to the lower frusto-conical portion 14 at the unloading opening 17. Connected to the unloader 18 is a drive means 19 which is more clearly shown in FIGURE 2.

As represented in FIGURE 2, the unloader 18 has a frusto-conically shaped housing 20 which is continuous with the portion 14 of tank 10. Housing 20 may be secured to portion 14 by bolts 21 if it is desired to remove the unloader from the storage tank 10 for use with other storage tanks.

Housing 20 has a bottom plate 22 (FIGURES 2 and 3) to which is secured a bearing member 23 by fasteners 24.

Forming part of the housing 20 is also a passageway 25 which leads outwardly from the discharge port 26 (see FIGURE 3). Passageway 25 may be conveniently mounted tangentially to housing 20. The passageway is adapted to be connected to an external conveyance system such as a conventional auger (not shown).

Referring to FIGURES 2–4, an elongate shaft 27 is rotatably journaled in bearing member 23 and extends for a substantial distance upwardly into the frusto-conical portion of the tank. Extending downwardly and exteriorly of the tank is the lower end 28 of shaft 27 to which is secured a drive pulley 29 which forms a part of drive means 19.

Secured to the shaft 27 are a plurality of flexible beater members such as lengths of chain 30. Also secured to the shaft 27 below the flexible members 30 and above the bottom plate 22 is a rotating discharge means such as disc 31.

The flexible members 30 are secured at one end 32 to the shaft 27 and the other end 33 is free to swing in an arcuately sweeping motion upon rotation of the shaft as will be described subsequently. Flexible members 30 may be any material which has substantial mass such as weighted belts or link chain. It is found that steel links of one-quarter inch material gives good results for most purposes. As seen in FIGURE 6, the chain lengths vary according to the distance on the shaft above disc 31. The length is dependent upon the distance between the point of securement 34 and the side wall of lower portion 14. It is found that when flexible members such as chains are used, a balanced condition may be obtained by staggering the chains on the shaft as shown in FIGURE 6; the distance 35 between chains may be selected according to the size of the tank and the type of material to be discharged. For conventionally sized feed tanks the spacing which I use is approximately eight inches. With the two center chains 36 and 37 located on the same side of shaft 27 and opposite chains 38 and 39, a good balance is attained during rotation of shaft 27 and objectional vibration is thus avoided.

Referring to FIGURES 3 and 4, the disc 31 is substantially the diameter of bottom plate 22 and has a plurality of discharge paddles 40 secured thereto on the upper bulk material contacting surface 41. Referring to FIGURE 2, the disc is not only in close clearance with the bottom plate 22 but in addition is positioned above the lower edge 42 of discharge port 26 for a reason to be subsequently set forth.

Referring particularly to FIGURES 4, 5 and 6, the operation of the storage tank and unloader assemblage will now be described.

Assuming the unloader 18 has just been installed upon the storage tank 10, and no bulk material is contained within the storage tank, the flexible members 30 would merely depend from their point of securement 34 as appears in FIGURE 4. The flexible members also have the appearance, of that in FIGURE 4, after the storage tank has been filled with bulk material 43.

Assuming next that it is desired to unload some of the bulk material from the storage tank, the drive means 19, explained above, is energized whereby to rotate drive pulley 29 and in turn rotate shaft 27. As may be seen in FIGURE 5, when the shaft is first rotated, the chains take on a spiraled orientation since the bulk material confines them to the immediate area of the shaft. Only a relatively small amount of torque need be exerted on the shaft since the flexible members automatically shorten their lever arms whenever the resistance of the bulk material increases.

Even though the flexible members are spiraled about the shaft, they will contact and cause the bulk material in the immediate vicinity of the shaft to be conveyed downwardly. Thus disc 31 will have bulk material fed thereto at all times during rotation.

Assuming that the bulk material is of a slight viscous nature, whereby the particles easily adhere to each other, it may be recognized that after a small period of time the bulk material about the shaft would be swept away by the flexible members and conveyed downwardly to the disc 31. The remaining channel is indicated by the line 44.

Upon continued rotation of the shaft, centrifugal force will cause the flexible members' free ends to tend outwardly in a free swing motion. By swinging outwardly, the ends 33 will begin enlarging the channel 44. As the shaft continues its rotation, the flexible members will constantly tend to unspiral and tend to extend outwardly of the shaft thereby continuously sweeping away larger volumes of bulk material.

Ultimately by the rotation of the shaft and discharge of the bulk material by the disc 31, the flexible members will acquire the positions shown in FIGURE 6. In this instance, the volumetric area of discharge previously represented by 44 is now extended to the volumetric area represented by number 45. With sufficient rotational speed of the shaft, the flexible members will tend to extend at substantially right angles to the shaft thereby sweeping out a sufficiently large volume to prevent the bulk material from bridging across the lower frusto-conical portion 14 and to permit material from the cylindrical portion 13 to advance by gravity to replace that which is discharged from the lower portion.

Through the above, it is seen that no greater torque is required for starting the shaft in rotation, when the flexible members are compacted with bulk material, than when the flexible members are free to rotate in the extreme condition represented in FIGURE 6. Likewise, the torque required when the flexible members are in a condition intermediate the extremes (as shown in FIGURES 4 and 5) is not appreciable.

Another novel feature of this invention resides in the position of the discharge disc 31 and the position of passageway 25. Referring to FIGURE 2, and as previously explained, the lower edge 42 of discharge port 26 is positioned well below the disc 31. In this manner, a substantial arcuate portion of the disc is exposed on the under side to passageway 25 thereby allowing bulk material which has collected beneath disc 31, but above plate 22, to be discharged through the passageway. Thus the bulk material will not build up below the disc and cause frictional drag on the mating parts and thereby require additional drive torque.

It may thus be seen that a new and novel storage tank and unloader assemblage has been devised for discharging the bulk material in a positive and simple manner yet with a minimum of expense.

It will, of course, be understood that various changes may be made in the form, details, arrangements and proportions of the parts without departing from the scope of this invention as set forth in the appended claim.

What is claimed is:

A bulk material storage tank and unloader assembly comprising, an upstanding circular tank having an upper cylindrical portion and a lower frusto-conical portion, said tank further having a loading opening at the upper end of the cylindrical portion and an unloading opening at the lower end of said frusto-conical portion, a frusto-conically shaped housing secured to said tank at said lower unloading opening and having a discharge port, an outwardly and downwardly extending passageway which is tangentially secured to said housing, an upstanding shaft rotatably journaled in said housing, said shaft having a portion within said tank and a portion extending outwardly of said housing, a plurality of flexible members pivotally secured endwise to said shaft at the portion thereof within said tank so as to be free to hang vertically due to gravity when said shaft is stationary, a centrifugal discharge disc secured to said shaft below said flexible members and adjacent said housing, said discharge disc having a substantial arcuate portion thereof immediately exposed to said passageway and positioned adjacent the medial portion of said discharge port, and drive means for rotating said shaft, whereby rotation of said shaft will cause said flexible members to radially extend outwardly of said shaft toward the wall of said circular tank.

References Cited in the file of this patent

UNITED STATES PATENTS

| | | |
|---|---|---|
| 1,500,581 | Filson | July 8, 1924 |
| 1,551,971 | Shipton | Sept. 1, 1925 |
| 2,497,406 | Graham | Feb. 14, 1950 |
| 2,795,358 | Saxlund | June 11, 1957 |
| 3,037,713 | Carroll | June 5, 1962 |